United States Patent [19]
Hansen

[11] Patent Number: 5,800,704
[45] Date of Patent: Sep. 1, 1998

[54] FOAM FLOTATION PROTEIN SEPARATIOR

[75] Inventor: Klaus Hansen, Osnabruk, Germany

[73] Assignee: AquaMedic Anlagenbau GmbH, Melle, Germany

[21] Appl. No.: 737,354

[22] PCT Filed: May 3, 1995

[86] PCT No.: PCT/EP95/01670

§ 371 Date: Nov. 8, 1996

§ 102(e) Date: Nov. 8, 1996

[87] PCT Pub. No.: WO95/30328

PCT Pub. Date: Nov. 16, 1995

[30] Foreign Application Priority Data

May 10, 1994 [DE] Germany .................... 44 16 447.5

[51] Int. Cl.⁶ .................... A01K 63/04; C02F 1/24
[52] U.S. Cl. .................... 210/169; 210/221.2; 210/416.2; 261/28; 261/84; 261/93; 261/DIG. 42; 119/261; 119/263; 366/103; 366/293; 415/90; 415/200 R; 415/200 A
[58] Field of Search .................... 210/221.2, 169, 210/416.2; 261/28, 84, 93, DIG. 42; 119/261, 263, 264; 366/103, 293; 415/90, 209.1, 206; 416/200 R, 200 A, 228

[56] References Cited

U.S. PATENT DOCUMENTS

| | | |
|---|---|---|
| 3,669,883 | 6/1972 | Huckstedt . |
| 3,772,192 | 11/1973 | Huckstedt . |
| 3,904,393 | 9/1975 | Morse . |
| 3,957,017 | 5/1976 | Carmignani . |
| 4,834,872 | 5/1989 | Overath . |
| 5,282,962 | 2/1994 | Chen . |
| 5,484,525 | 1/1996 | Mowka . |

FOREIGN PATENT DOCUMENTS

| | | |
|---|---|---|
| 2364181 | 5/1978 | France . |
| 1289353 | 2/1969 | Germany . |
| 2102545 | 8/1972 | Germany . |
| 3525861 | 1/1987 | Germany . |
| 9209563 | 10/1992 | Germany . |

OTHER PUBLICATIONS

Moe, Jr, Martin A., "The Marine Aquariuan Reference"; pp. 272–287. Copyright 1989, Martin A. Moe Jr., Green Turtle Publications, Plantation Florida.

*Primary Examiner*—Thomas M. Lithgow
*Attorney, Agent, or Firm*—Harness, Dickey & Pierce, P.L.C.

[57] ABSTRACT

In order to reduce the noise made by a foam flotation separator working on the dispersion apparatus principle and maximise the air supply, the foam flotation separator is designed so as to comprise a dispersion pump (2) which draws in water and a gas such as air and/or ozone, a reaction chamber connected on the delivery side, a collector (5) on the upper end of the reaction chamber (4) and an expanded section (15) at the lower, outlet end of the reaction chamber (4).

25 Claims, 1 Drawing Sheet

FOAM FLOTATION PROTEIN SEPARATIOR

TECHNICAL FIELD

The invention relates to a foam flotation separator, in particular a foam flotation protein separator for sea water aquaria, and to an impeller for a dispersion pump for dispersing gas such as air and/or ozone in water for foam flotation separators of the above-mentioned type.

A preferred field of application of such foam flotation separators is in sea water aquaria, which have to be constantly filtered in order to maintain satisfactory water quality. Of the different types of filtration foam flotation protein removal has proved particularly worthwhile and has been adopted in various forms.

In this process the water is brought into contact with very fine bubbles of air on which organic pollutants are taken up. The air bubbles collect as a stable foam on the surface of the apparatus, from which they can be removed.

In foam flotation protein removal a particular problem arises in the introduction of the gas, as a rule air, which may be enriched with ozone, into the water. For this purpose various methods are known:

introduction through wooden or ceramic distributors introduction through venturi nozzles with gas intake on the delivery side of the pump introduction through dispersers, that is to say, pumps which draw in the gas on the intake side of the pump and mix the air bubbles with the water at an impeller wheel in the pump housing and so comminute them.

PRIOR ART

All known devices and processes have some considerable disadvantages. Thus distributor blocks are very maintenance intensive and need to be frequently replaced. Installations with venturi nozzles need high pressure at the injector and are therefore wasteful of energy, particularly for small installations, since they need relatively large and powerful pumps with a correspondingly greater power consumption. While the installations operating on the disperser principle give satisfactory results even in the case of small installations, hitherto known devices nevertheless generate a considerable amount of noise and cause considerable difficulty in adjusting the equilibrium between the amounts of gas or air and water delivered. In the case of many foam flotation separators found in aquaria air bubbles get into the aquarium together with the purified water, which can have harmful effects on the occupants of the aquarium, particularly when ozone is used in the foam separator.

From German Utility Model 92 09 563 a protein-trapping device operating on the disperser principle is known which draws in the air with normal impeller wheel pumps. Here the air output can in some cases and in particular circumstances be satisfactory, but in operation these devices generate a considerable volume of noise, and buzzing sounds occur. In addition the known devices operating on this principle cannot be adapted to different pumps or outputs.

United States specification 3 669 883 discloses a foam flotation protein separator having in the relevant region a cylindrically shaped reaction chamber which is closed at the bottom. This known device is operated on the centrifugal principle, wherein an outer, bubble-free zone is created while the inner liquid column is resolved into the desired separated products. As a result this apparatus, too, suffers from the noise problem mentioned, quite apart from the fact that the separating action leaves something to be desired owing to the occurrence of vortex formation.

THE INVENTION

It is therefore the object of the present invention to improve the dispersion principle so that it can be used in a low-noise manner and so that the escape of air bubbles into the aquarium is reduced or the supply of air is optimised.

This object is achieved by the features of the main claim.

A particular feature of the invention consists in the cross sectional enlargement of the preferably tubular reaction chamber, for in this region the rate of flow of the gas-water mixture introduced into the reaction tube is reduced because of the enlargement of the cross-section, so that the air bubbles come to a standstill and even ascend, and do not leave the reaction tube with the stream of water but pass into the collector with the particles which are to be removed adhering to them.

In another embodiment of the invention a prefilter is fitted on the intake side of the centrifugal disperser pump which acts as a mechanical filter and holds back the coarse dirt.

Preferably the enlargement of the cross-section is in the shape of a funnel at the lower end of the vertically disposed reaction tube, at the outlet of which, in the region of the enlargement, there is preferably a filter, which can consist of a filter basket surrounding a filter sponge.

The gas-water mixture which is produced by the dispersion pump through the gas, i.e. preferably air, being drawn in by the reduced pressure at the intake side and mixed with the water in the pump and broken up into extremely fine bubbles, then passes under pressure into the upper region of the reaction tube with a downwardly directed flow, so that the air is at first carried along with it. In the funnel-shaped enlargement of the cross-section the rate of flow is reduced, so that the air bubbles come to a standstill and rise. The smallest air bubbles, which are still carried along downwards, pass with the water through a central inlet opening provided in the filter basket on the inlet side into the filter sponge, which when ozone is used may also be coated or interspersed with active carbon in order to reduce any residual ozone. The central inlet opening is preferably surrounded by several smaller diameter riser holes through which the air bubbles which have been carried along can ascend again in this particularly quiet zone. This arrangement prevents large air bubbles, which would interfere with the formation of foam in the upper region of the reaction tube, from rising out of the sponge.

In order to produce a much reduced pressure at the pump and to pump a large quantity of air simultaneously with a large quantity of water, in a further embodiment of the invention the impeller of the dispersion pump is formed as a needle wheel, as a result of which the noise of operation is also minimised and the air bubbles are effectively broken up. This large quantity of air is needed in order to ensure the high capacity of the foam flotation separator. The needle wheel preferably consists of a plurality of needles or pins projecting radially outwardly in the form of a star and can be made up of several (two to ten) needle disks, each carrying needles lying in a plane, which can be pushed non-rotatably on to an axle, offset so that the needles are not in alignment in the axial direction. The axle can be in the form of an adapter, so that the needle wheel of the invention can be adapted to different types of pump. The modular construction of the needle wheel makes it possible to use the needle disks in pumps of different power and having pump housings of different dimensions.

A further optimisation of the efficiency of the foam flotation separator of the invention is obtained through the form of the collector which is fitted on to the reaction tube as an open bottomed releasable foam head and may be provided with a lid having air escape holes.

The rising air bubbles are dewatered in the upper region of the foam flotation separator and the foam is forced into the foam head, where it is stored. Since the foam head is fitted releasably on the reaction tube, it can easily be removed for regular cleaning. Its special form consists in its double-walled construction, with the walls being joined integrally together at their lower rims and the inner wall being shorter than the outer one in the axial direction.

While the outer of the two coaxial walls of the foam head is cylindrical, the inner wall forming the foam tube tapers in a funnel or conical shape from the lower rim towards the interior of the foam head, without any edges, to less than half its original diameter, which preferably corresponds to that of the upper rim of the reaction tube. This conical or funnel-shaped contour leads in the course of the dewatering, which involves a reduction in volume, to a constant rate of ascent of the bubbles and to a particularly easy expulsion of the foam into the outer, annular region of the foam head.

BRIEF DESCRIPTION OF THE DRAWINGS

The invention will now be explained in more detail, by way of example, with reference to an embodiment shown in the accompanying drawings, in which.

MODES OF CARRYING OUT THE INVENTION

The foam flotation separator 1, which is intended to be immersed completely in the water of the aquarium to be treated, comprises, in the embodiment shown, the following components:

a dispersion pump 2, a prefilter fitted before the pump 2 on the water intake side, a reaction tube 4 fitted after the pump 2 on the delivery side, and a foam head 5 fitted on to the top of the vertical reaction tube 4.

Figure 2:
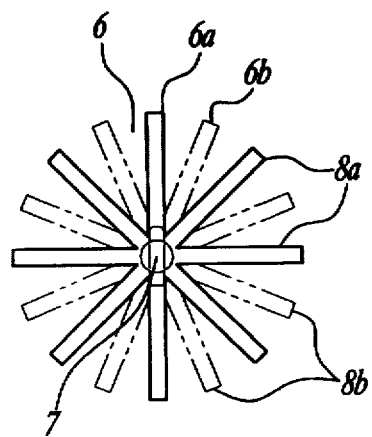
FIG. 2 is an axial front view of an impeller for the dispersion pump of the foam flotation separator shown in FIG. 1.

For the reasons already explained, the dispersion pump 2 is provided in the present exemplary embodiment with an impeller 6 having the form shown in FIG. 2 instead of the usual impeller wheel of the centrifugal pump. This impeller is in the form of a needle wheel and suitably consists of a plurality of needle disks 6a, 6b pushed in succession on to an axle 7. According to the desired capacity and the dimensions of the pump housing, from two to ten of the flat needle disks 6a, b,, can be fitted on a corresponding axle 7 in the form of an adapter depending on the type of pump, in such a way as to produce the offset of the needles shown in FIG. 2, which leads to an increased efficiency of dispersion. The needles 8 are preferably circular in cross-section, and in each case eight to twelve of them are arranged on a disk perpendicular to the axle 7 to form a star.

The mechanical prefilter 3 consists of a perforated housing or mesh cage 9 which encloses a sponge 11. Water drawn in enters the prefilter 3 on all sides as shown by the arrows A, is freed from coarse dirt and passes as shown by the arrow B through a connecting neck 12 into the dispersion pump 2, which by means of the impeller 6 simultaneously draws in air or another treatment gas, which may be enriched with ozone, through an air intake branch 13 as shown by the arrow C, so that turbulence of the gas with the water and intensive breaking down of the gas bubbles into smaller bubbles down to microbubbles takes place (dispersion).

This "dispersion" mixture is pumped by the pump 2 via the delivery pipe 14 into the upper part of the reaction tube 4, the downward bend at the end of the delivery pipe 14 causing a downward direction of flow D which can also be given a tangential component by a corresponding inclination of the bent end of the pressure line 14.

The downwardly directed stream carries with it the air bubbles on which the particles to be removed, particularly protein, are taken up. The further the bubbles pass downwards, the greater does the upwardly directed rising force become, so that the bubbles begin to come to a standstill in the stream or to rise upwards.

At the lower end the reaction tube has a cross-sectional enlargement 15 in the form of a funnel section, which is adjoined by an end section of the reaction tube 4 which receives an end filter 16. The end filter 16 consists of a filter sponge, possibly interspersed and/or coated with active carbon, which is surrounded by a cage of which the top face is provided with a central inlet opening 17 of about two thirds of the diameter of the tube, which is surrounded by several riser holes 18 of smaller diameter. At the bottom the filter 16 is provided with a screen 19 so that the purified aquarium water can leave there as shown by the arrow E.

The filter 16 serves, as already mentioned, to ensure that any air bubbles which may get below the funnel 15 are held back in the filter sponge at the downward outlet from the reaction tube 4 and are caused to rise in the reaction tube, the form described above preventing the ascent from the sponge of large air bubbles which in the separating tube, in countercurrent to the freshly dispersed water introduced, would impair the foam formation.

Figure 1:
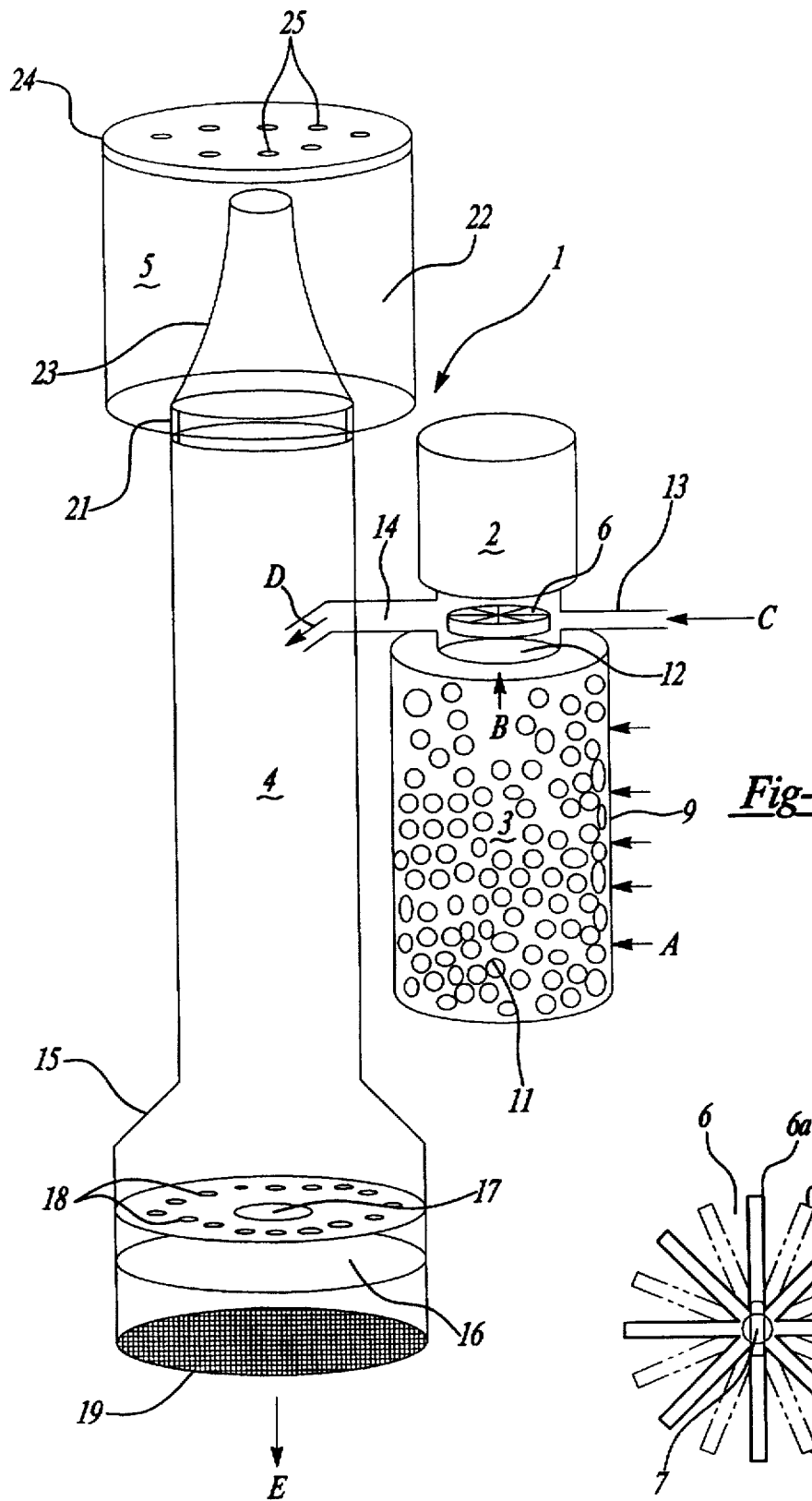
FIG. 1 shows a diagrammatic perspective view of a foam flotation protein separator.

As likewise already mentioned, in the upper part of the reaction tube 4 the dewatering of the air bubbles enriched with the substances to be removed takes place with the formation of foam. To optimise collection here, the foam is carried over into the foam head 5, which is regularly emptied and which in the exemplary embodiment shown is plugged on to the reaction tube 4 by means of a plug connection 21, so that it can be removed whenever necessary. Through the double-walled form of the foam head 5, which can be seen from the representation in FIG. 1, an annular space 22 is formed into which the foam rising through the conically inwardly tapering foam tube 23, which is shorter than the outer wall of the foam head, collects. The conical contour of the foam tube 23 takes account in an excellent manner of the fact that through the progressive dewatering the foam decreases in volume towards the top, so that in the annular space 22 a particularly optimal foam consistency is then obtained. By removing a lid 24 which is provided on top of the foam head 5 and is provided with air escape holes 25, the annular space 22 is exposed for cleaning out.

A particular advantage for manipulation is that the individual components of the foam flotation separator are connected together by plug and socket joints, so that they can be taken apart and put together as modules, which greatly facilitates maintenance and assembly. Thus the prefilter 3 can be separated from the pump 2 in just the same way as this can be separated from the reaction tube 4 and the foam head 5 from the reaction tube.

INDUSTRIAL APPLICATION

The form and arrangement of the individual components leads to an extremely practical device.

I claim:

1. A foam flotation separator for sea water aquaria, comprising:
   a dispersion pump (2) having an intake side and a delivery side, said intake side draws in water to be treated containing pollutants and gas, said gas is air or ozone or a mixture thereof;
   a reaction chamber (4) connected thereto on the delivery side, the reaction chamber having a lower outlet end having a purified water outlet and an upper end foam outlet for a foam containing said pollutant;
   a foam collector (5) having an open bottom on the upper end of the reaction chamber (4), and
   a cross-sectional enlargement (15) at the lower, outlet end of the reaction chamber (4) below the connection of the pump delivery side to the reaction chamber said cross sectional enlargement (15) at the lower end of the reaction chamber being of sufficient magnitude that a downward flow rate of gas and water is reduced so that the air bubbles come to a standstill and rise.

2. The foam flotation separator according to claim 1, further comprising an intake-side prefilter (3) for the water to be treated.

3. The foam flotation separator according to claim 1, having a vertically disposed tube as reaction chamber (4).

4. The foam flotation separator according to claim 3, wherein enlargement (15) at the lower, outlet end of the vertically disposed reaction tube (4) is funnel-shaped.

5. The foam flotation separator according to claim 1, having a downwardly directed water and gas dispersion inlet (D) in the reaction chamber (4).

6. The foam flotation separator according to claim 1, having a filter (16) at the outlet end of the reaction chamber (4).

7. The foam flotation separator according to claim 6, wherein the filter (16) consists of a filter basket surrounding a filter sponge.

8. The foam flotation separator according to claim 6, wherein the filter (16) is an active carbon filter sponge.

9. The foam flotation separator according to claim 7, wherein the filter basket has an outlet end and an inlet end with a screen (19) at its outlet end and the inlet end is provided with a central inlet opening (17) surrounded by smaller diameter riser holes (18).

10. The foam flotation separator according to claim 1, wherein the open-bottom foam collector (5) is fitted releasably on to the reaction tube (4).

11. The foam flotation separator according to claim 1, wherein the foam collector (5) is provided with a lid (24).

12. The foam flotation separator according to claim 11, wherein the lid (24) is provided with air escape holes (25).

13. The foam flotation separator according to claim 1, wherein the foam collector (5) is double-walled having an inner wall (23) and an outer wall, with the walls connected integrally together at lower rims thereof.

14. The foam flotation separator according to claim 13, wherein the inner wall (23) is shorter in the axial direction than the outer wall.

15. The foam flotation separator according to claim 13, wherein the walls are coaxial.

16. The foam flotation separator according to claim 13, wherein the inner wall (23) forming a foam tube tapers in a funnel shape from the lower rim towards the interior of the foam collector (5).

17. The foam flotation separator according to claim 16, wherein the largest cross-section of the foam tube(23) corresponds to that of the upper end foam outlet of the reaction chamber (4).

18. The foam flotation separator according to claim 2, wherein the reaction chamber (4), the collector (5), and the prefilter (3) all have circular cross sections.

19. The foam flotation separator (1) according to claim 1, wherein the dispersion pump has an impeller with a wheel (6) carrying a plurality of needles (8).

20. The foam flotation separator according to claim 19 wherein the impeller has a plurality of needle disks secured non-rotatable in axial succession on an axle (7).

21. The foam flotation separator of claim 20 wherein the needles (8) project perpendicular to the impeller axle (7) in the form of a star.

22. The foam flotation separator of claim 20 wherein each needle disk carries eight to twelve needles (8) in a plane.

23. The foam flotation separator of claim 20 wherein the needle disks are mounted angularly offset on the axle (7).

24. The foam flotation separator of claim 20 wherein the needle wheel (6) consists of up to ten needle disks disposed offset one after the other.

25. The foam flotation separator of claim 20 having a pump-type-dependent adapter on to which the needle disks can be pushed.

* * * * *